United States Patent
Morejon et al.

(10) Patent No.: US 7,325,957 B2
(45) Date of Patent: Feb. 5, 2008

(54) POLARIZED LIGHT EMITTING DIODE (LED) COLOR ILLUMINATION SYSTEM AND METHOD FOR PROVIDING SAME

(75) Inventors: Israel J. Morejon, Tampa, FL (US); Jinhui Zhai, Clearwater, FL (US); Haizhang Li, Orlando, FL (US); Robert J. Pantalone, Clearwater, FL (US)

(73) Assignee: Jabil Circuit, Inc., St. Petersburg, FL (US)

( * ) Notice: Subject to any disclaimer, the term of this patent is extended or adjusted under 35 U.S.C. 154(b) by 336 days.

(21) Appl. No.: 11/158,806

(22) Filed: Jun. 22, 2005

(65) Prior Publication Data

US 2006/0164726 A1 Jul. 27, 2006

Related U.S. Application Data

(60) Provisional application No. 60/646,777, filed on Jan. 25, 2005, provisional application No. 60/646,778, filed on Jan. 25, 2005, provisional application No. 60/646,775, filed on Jan. 25, 2005.

(51) Int. Cl.
*F21V 7/04* (2006.01)
(52) U.S. Cl. ............... 362/555; 362/551; 362/561; 362/800; 353/31; 353/33; 353/34; 353/102; 353/98; 353/99; 359/618; 359/619
(58) Field of Classification Search ............... 362/555, 362/800, 551, 561; 353/31, 33, 94, 32, 34, 353/37, 102, 98, 99; 359/722, 589, 618, 359/619; 385/146, 31
See application file for complete search history.

(56) References Cited

U.S. PATENT DOCUMENTS

| | | | |
|---|---|---|---|
| 6,092,901 A | 7/2000 | Hashizume et al. | |
| 6,220,714 B1 | 4/2001 | Eguchi | |
| 6,224,216 B1 | 5/2001 | Parker et al. | |
| 6,411,438 B1 | 6/2002 | Itoh et al. | |
| 6,587,269 B2 | 7/2003 | Li | |
| 6,644,814 B2 | 11/2003 | Ogawa et al. | |
| 6,739,726 B2 | 5/2004 | Li | |
| 6,776,489 B2 | 8/2004 | Suzuki | |
| 7,072,096 B2* | 7/2006 | Holman et al. | 359/298 |
| 7,116,463 B2* | 10/2006 | Wu et al. | 359/291 |
| 7,222,968 B2* | 5/2007 | Magarill et al. | 353/31 |
| 2004/0100697 A1* | 5/2004 | Sedlmayr | 359/495 |

* cited by examiner

*Primary Examiner*—Sandra O'Shea
*Assistant Examiner*—Jessica L McMillan
(74) *Attorney, Agent, or Firm*—Price Heneveld Cooper DeWitt & Litton LLP

(57) ABSTRACT

A polarized light illumination system includes a light emitting diode (LED) (601, 602, 603) for providing a source of light that is directed to a non-polarizing dichroic combiner (607) for combining light from the LEDs into a single light source. A power beam splitter (PBS) (608) is then used for splitting the single light source into polarized light components and an output waveguide (611) operates to provide a source of uniformly illuminated light. A condenser lens (612) then projects the uniformly illuminated light to a microdisplay panel (613) for use with a television receiver or other type of display monitor.

30 Claims, 7 Drawing Sheets

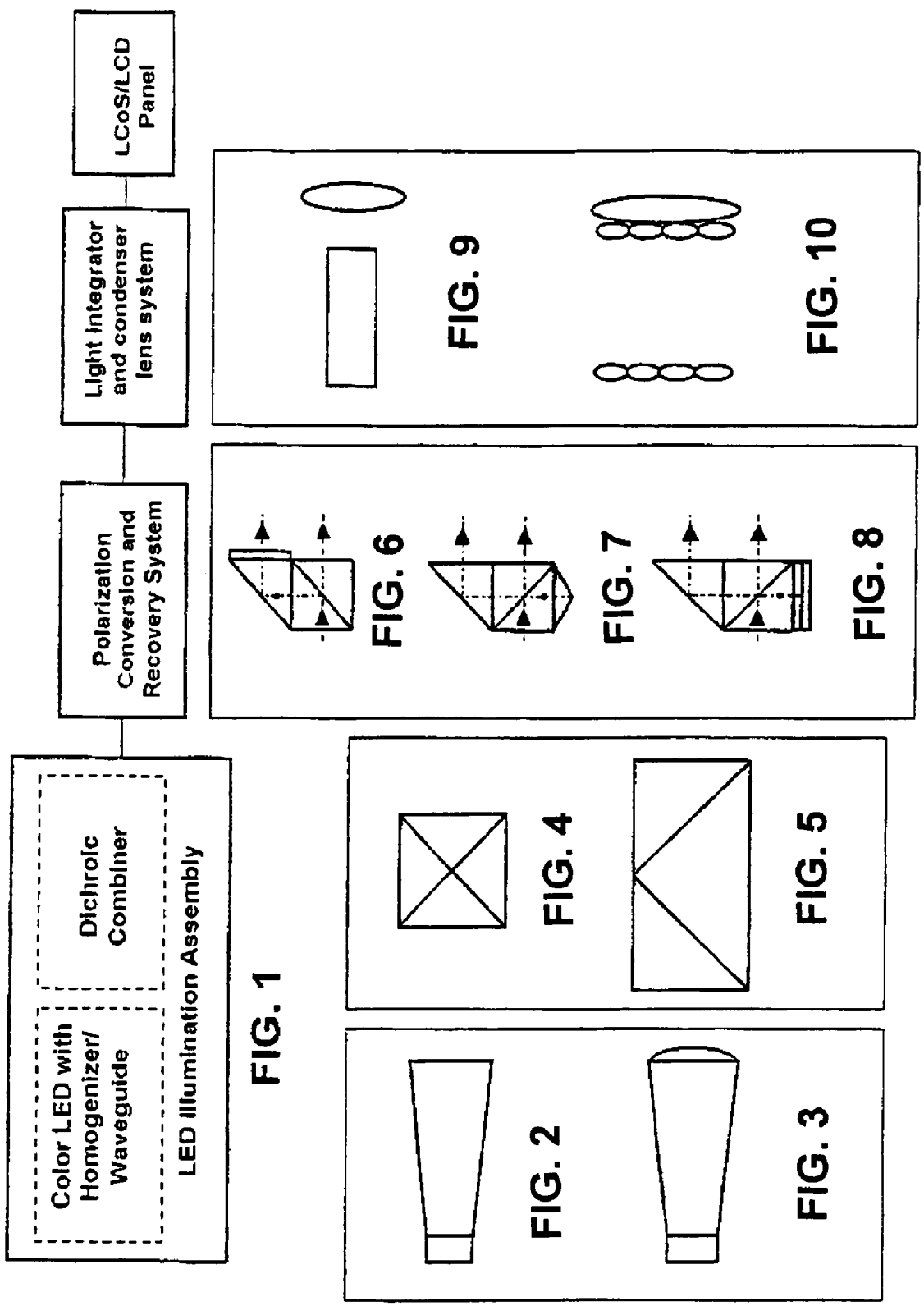

POLARIZED LIGHT EMITTING DIODE (LED) COLOR ILLUMINATION SYSTEM AND METHOD FOR PROVIDING SAME

CROSS-REFERENCE TO RELATED APPLICATIONS

Priority for this non-provisional application is based on provisional patent application entitled LED Polarizing Optics for Color Illumination System, Ser. No. 60/646,775, filed Jan. 25, 2005; LED Color Illumination Apparatus for Polarized Light Projection System, Ser. No. 60/646,777, filed Jan. 25, 2005; and RGB LED Illumination Apparatus for DLP Projection Applications, Ser. No. 60/646,778, filed Jan. 25, 2005, all owned by Jabil Circuit, Inc.

BACKGROUND OF INVENTION

1. Field of the Invention

This invention generally relates to an LED color illumination apparatus for a polarized light projection system and more specifically to a light projection system for providing uniform light distribution to a display panel.

2. Background of the Invention

In recent years, digital projection systems using spatial light valve modulators, such as a digital micromirror device (hereafter "DMD"), transmissive liquid crystal display (hereafter "LCD") and reflective liquid crystal on silicon (hereafter "LCoS") have been receiving much attention as they provide a high standard of display performance. These displays offer such advantages as high resolution, a wide color gamut, high brightness and a high contrast ratio.

Color projection systems of the type based on either LCD technology or LCoS technology require linearly polarized light as the illumination light source. LCD and LCoS devices depend on either the polarization rotation effect or the birefringent effect of the liquid crystal to generate light. The light emitted from the light source must be converted into polarized light for illuminating an LCD or LCoS spatial light modulator. Those skilled in the art will recognize that the optical system contained within a commercial LCD or LCoS projector typically combines a fly's-eye lens array with a polarizing beam splitter array. Examples of such an arrangement can be found in U.S. Pat. Nos. 6,411,438, 6,776,489, 6,739,726 and 6,092,901 which are all incorporated by reference herein. Two drawbacks to using the fly's-eye type of optical system are that it is bulky and expensive to manufacture.

Most projection systems use short arc gaseous white lamps such as ultra-high pressure mercury, xenon or the like that can achieve a relatively high etendue efficiency required for panel illumination. Etendue refers specifically to the geometric capability of an optical system to transmit radiation such as its throughput. Currently, only a limited number of manufacturers are capable of producing high-quality short arc lamps. The typical operational lifetime of these types of lamps is about 2000 to 6000 hours. Moreover, there are significant amounts of ultraviolet (UV) and infrared (IR) light emitted from this type of lamp. The unfiltered UV light reduces the lifetime of both the optical components and microdisplay panel within the system, while IR light requires additional cooling devices to maintain a desired operating temperature.

Significant efforts have been dedicated towards moving away from short arc lamps through the utilization of light emitting diodes (LED) in projection illumination systems. One apparent advantage is that LEDs using three primary colors can produce a wider color gamut than conventional white lamps. In addition, LEDs have a high light efficiency, i.e., the ratio of luminous output to the electrical power required, since all spectra of the red, green and blue light from LEDs can be utilized in a visual system. U.S. Pat. No. 6,224,216, which is incorporated by reference herein, describes a triple-path projector employing three single color LED arrays. The LEDs emit light propagating along separate paths through fiber bundles to respective waveguide integrators and thereafter to respective display devices. A problem exists in this type of system because of the coupling between LEDs and fibers. In practice, due to coupling and transmission loss, it is difficult to efficiently couple light emitting from the LED arrays to the corresponding fiber bundles and waveguides.

Similarly, U.S. Pat. No. 6,220,714 discloses a projection system using LEDs for illumination, where light beams emitting from red, green and blue LED arrays are collimated by condenser lenses which pass through fly's-eye type integrators for illuminating a single panel. Based on the geometry of the fly's-eye type integrator, only the surface area of light emitting region within a certain field of view can be effectively collected for illuminating a panel. A similar system can be found in U.S. Pat. No. 6,644,814, which describes an LED-illumination-type DMD projector with one panel. Generally, a common problem with these prior art systems is that some light from LEDs cannot enter the corresponding lens of the first and second fly's-eye lenses due to aberration and aperture limitation of the lens array. Therefore, a portion of the illumination light will fall outside the panel area, resulting in low light efficiency and low contrast.

Research has also been conducted on using light pipes as means of collecting and homogenizing light for polarize illumination applications. For example, U.S. Pat. No. 6,587,269 discloses a waveguide polarization recovery system comprising an input waveguide that inputs non-polarized light energy into the system. A polarizing beam splitter receives light energy from an input waveguide and transmits light energy of a first polarization type and reflects light energy of a second polarization type. A wave plate modifies the polarization of the transmitted or reflected light energy and an output waveguide removes polarized light energy from the previous system. This type of waveguide polarization recovery system was designed for use with white light sources so that multi-color light sources and beam combiner are not required.

Thus, there is a need to provide a light illumination device for LCD or LCoS projection systems or the like which utilizes polarized light with high efficiency and adequate brightness without utilizing complicated and/or expensive components.

BRIEF DESCRIPTION OF DRAWINGS

The above and other features and advantages of the present invention will be further understood from the following description of the preferred embodiments thereof, taken in conjunction with the accompanying drawings.

FIG. 1 is a block diagram illustrating the basic configuration of an RGB LED illumination system in accordance with an embodiment of the invention.

FIGS. 2-3 are schematic diagrams of an RGB LED with homogenizer/waveguide assembly used in FIG. 1.

FIGS. 4-5 are schematic diagrams for embodiments of a non-polarizing dichroic combiner used in FIG. 1.

FIGS. 6-8 are schematic diagrams for embodiments of a polarization conversion and recovery system used in FIG. 1.

FIGS. 9-10 are schematic diagrams for embodiments of a light integrator and condenser lens system used in FIG. 1.

DETAILED DESCRIPTION

Figure 11:
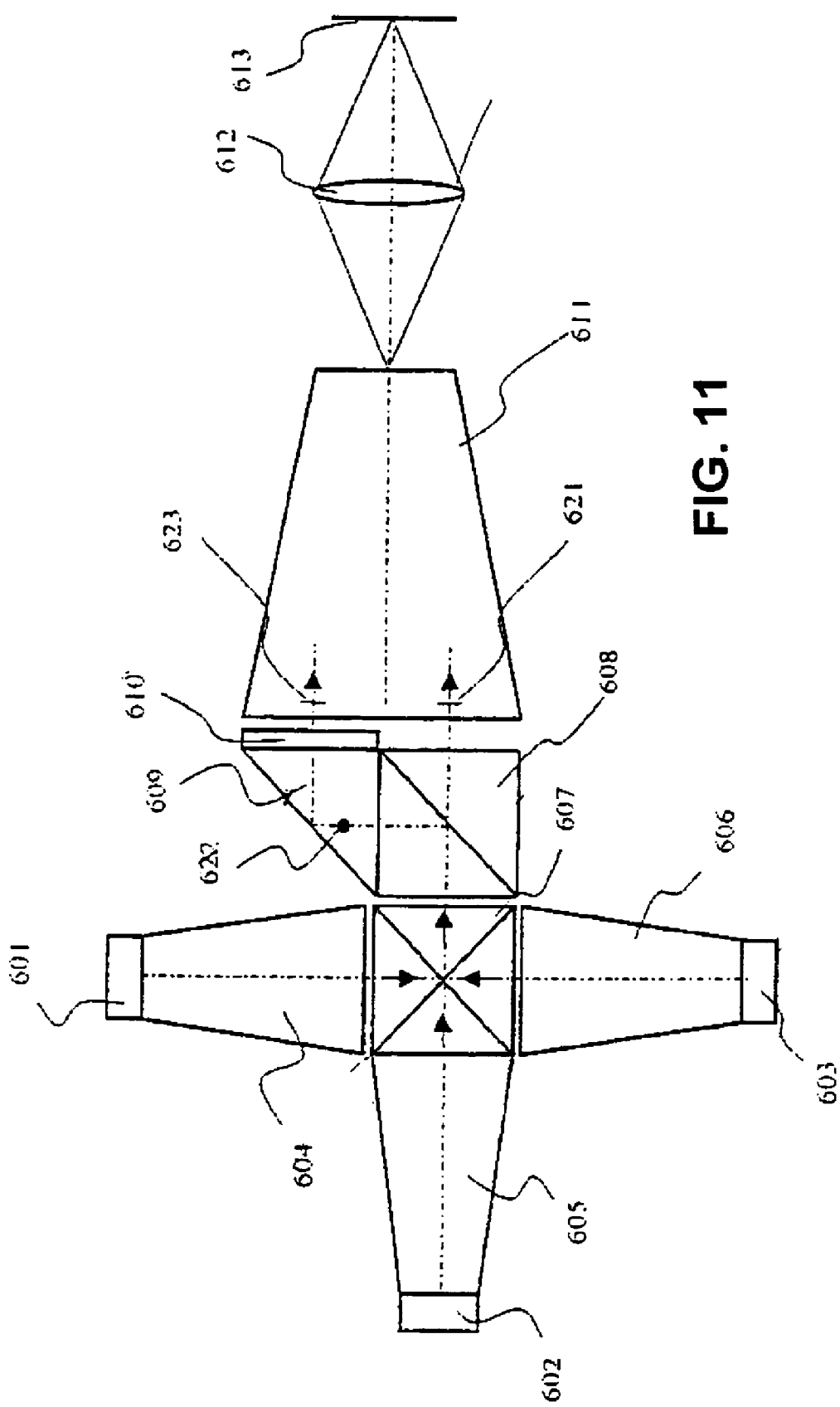
FIG. 11 is a schematic diagram illustrating an embodiment of an LED polarized light illumination system comprising an LCoS or LCD panel and components shown in FIGS. 2, 4, 6 and 9.

Hereinafter, the present description is directed in particular to elements forming part of, or cooperating more directly with, the apparatus in accordance with the invention. As will be understood by those familiar with the art, the present invention may be embodied in other specific forms without departing from the scope of the invention as a whole. Accordingly, the disclosures and descriptions herein are intended to be illustrative, but not limiting, of the scope of the invention which is set forth in the following claims.

FIG. 1 is a block diagram illustrating the basic configuration of an RGB LED illumination system in accordance with the present invention, which comprises a LED illumination assembly, a polarization conversion and recovery system and a light integrator to provide a linearly polarized light for illuminating a LCD or LCOS image display panel in a projection optical system. The LED illumination assembly shown in FIG. 1 further includes a color LED with homogenizer/waveguide and a dichroic combiner. The details of the LED illumination system as outlined in FIG. 1 are disclosed in copending application entitled LED Polarizing Optics for Color Illumination System, Ser. No. 60/646,775, filed Jan. 25, 2005, and assigned to Jabil Circuit, Inc., which is herein incorporated by reference.

FIGS. 2 and 3 are schematic diagrams for embodiments of an RGB LED assembled with a homogenizer/waveguide referred to in FIG. 1. The assembly shown in FIG. 2 includes either a red LED, or a green LED, or a blue LED with a tapered waveguide. The light beam emitting from the LED is collimated, homogenized and guided by said tapered waveguide. The waveguide can be either a hollow pipe with reflective inner surfaces or an integrator rod. The tapered waveguide can reduce the angle of the input cone at the tapered ratio due to etendue preservation where the product of the illuminated area and the illumination solid angle at the output face of the waveguide is equal to the etendue at the input face of the waveguide. The exit beams from the waveguide can be further converged by a lens attached to the exit surface of the waveguide, as illustrated in another embodiment shown in FIG. 3.

FIGS. 4-5 are schematic diagrams for embodiments of a non-polarizing dichroic combiner referred to in FIG. 1. FIG. 4 shows a non-polarizing cross-dichroic combiner (X-cube). FIG. 5 displays a V-type type dichroic prism as a variation to implement a dichroic combiner in accordance with the present invention. The main advantages of a V-type dichroic combiner over a non-polarizing cross-dichroic combiner are low cost and ease of manufacturing. Typically, the angular tolerance of a non-polarizing V-type dichroic prism is a range of a few arc minutes, while the angular tolerance of a cross-dichroic prism is a few arc seconds.

FIGS. 6-8 are schematic diagrams for embodiments of a polarization conversion and recovery system referred to in FIG. 1. FIG. 6 shows a polarization conversion and recovery system comprising a polarizing beam split (PBS), a 45-degree prism and a half wave plate. FIG. 7 shows another embodiment of a polarization conversion and recovery system comprising a polarization conversion and recovery system comprising a PBS cube, a 45-degree prism, and a retro-reflective polarization rotator. FIG. 8 displays yet another alternative embodiment of a polarization conversion and recovery system comprising a PBS cube, a 45-degree prism, a quarter wave plate and a mirror.

FIGS. 9-10 are schematic diagrams for embodiments of a light integrator referred to in FIG. 1, wherein FIG. 9 shows an output integrator waveguide and FIG. 10 shows a fly's-eye integrator, comprising a first lens array, a second lens array and a focusing lens. The output integrator waveguide can be a tapered hollow light pipe or a tapered solid rod integrator, increasingly tapered, decreasingly tapered, or straight shaped.

As will be evident to those skilled in the art, each component shown in FIGS. 2-10 can be combined with one another to constitute an LED color illumination system for polarized light projection applications in accordance with the present invention, as illustrated in six exemplary embodiments shown in FIGS. 11-16.

FIG. 11 illustrates a polarized light illumination system in accordance with an embodiment of the invention, comprising an LCoS or LCD panel and the optical elements illustrated in FIGS. 2, 4, 6 and 9. The system includes a red LED 601, a green LED 602, a blue LED 603, three tapered waveguides 604, 605, 606, a non-polarizing cross-dichroic combiner 607, a PBS 608, a 45-degree prism 609, a half wave plate 610, an output waveguide 611, a condenser lens 612 and a panel 613. The light from the red LED 601, passing through the waveguide 604, is reflected from the non-polarizing cross-dichroic combiner 607. Similarly, the light from the blue LED 603, passing through the waveguide 606, is reflected from non-polarizing cross-dichroic combiner 607. The green light of LED 602, passing through the waveguide 605, is converged by lens 608 and then transmits through non-polarizing cross-dichroic combiner 607. The red, green and blue axes are coincident on the exit face of the dichroic combiner 607. The light output from non-polarizing cross-dichroic combiner 607 is split by PBS 608 into s-polarized light 622 and p-polarized light 621. The p-component 621 transmits through the PBS 608 while the s-component 622 is reflected upwardly and is further reflected by the 45-degree prism 609 to the half wave plate 610. The half wave plate 610 rotates the polarization state of the s-component 622 to p-polarized component 623 that propagates in a direction parallel to the direction of the p-component 621.

The beams 621 and 623 are multi-reflected on the inner walls of the output waveguide 611 so that the exit surface of the waveguide 611 is uniformly illuminated with polarized light, and thereby light exiting from waveguide 611 is projected by the condenser lens 612 onto the DLP panel 613. The shape of the waveguide 611 can be increasingly tapered, decreasingly tapered, or straight, as needed. The exit surface aspect ratio of the waveguide 611 is proportional to that of the panel utilized in a projection system.

The waveguide can be either a hollow pipe with reflective inner surfaces or an integrator rod with total or partial internal reflection. The tapered waveguide can be used to collimate the light, homogenize it and shape the beam. As shown in FIG. 11, the area of the output face of the input waveguide is larger than that of the input face; therefore, the cone angle of the output beam is smaller than that of the input beam and hence collimation is achieved. Another function of the waveguide is that the waveguides can always be used as light homogenizers to change a spatially non-uniform distributed light on the input face to an output light with essentially uniform intensity. Furthermore, the aspect ratio of the output surface of the waveguide may be different from that of the input surface. This is especially useful in those applications when one requires the shape of the light source to be proportional to that of the panel it is illuminating. Even though the waveguide may introduce some optical loss when compared with a lens or a lens-array-based illumination system, the waveguide-based system is relatively compact in size, simple in structure, and inexpensive to manufacture.

In the configuration shown in FIG. 11, a gap is formed between the red waveguide 604 and the upper side surface of the non-polarizing cross-dichroic combiner 610, and a gap is formed between the blue waveguide 606 and lower side surface of the dichroic combiner 610. Thus, the light exiting from the green waveguide 605 reflects internally on both side surfaces of the dichroic combiner 610 and leakage of green light into the red and blue waveguides can be prevented.

Figure 12:
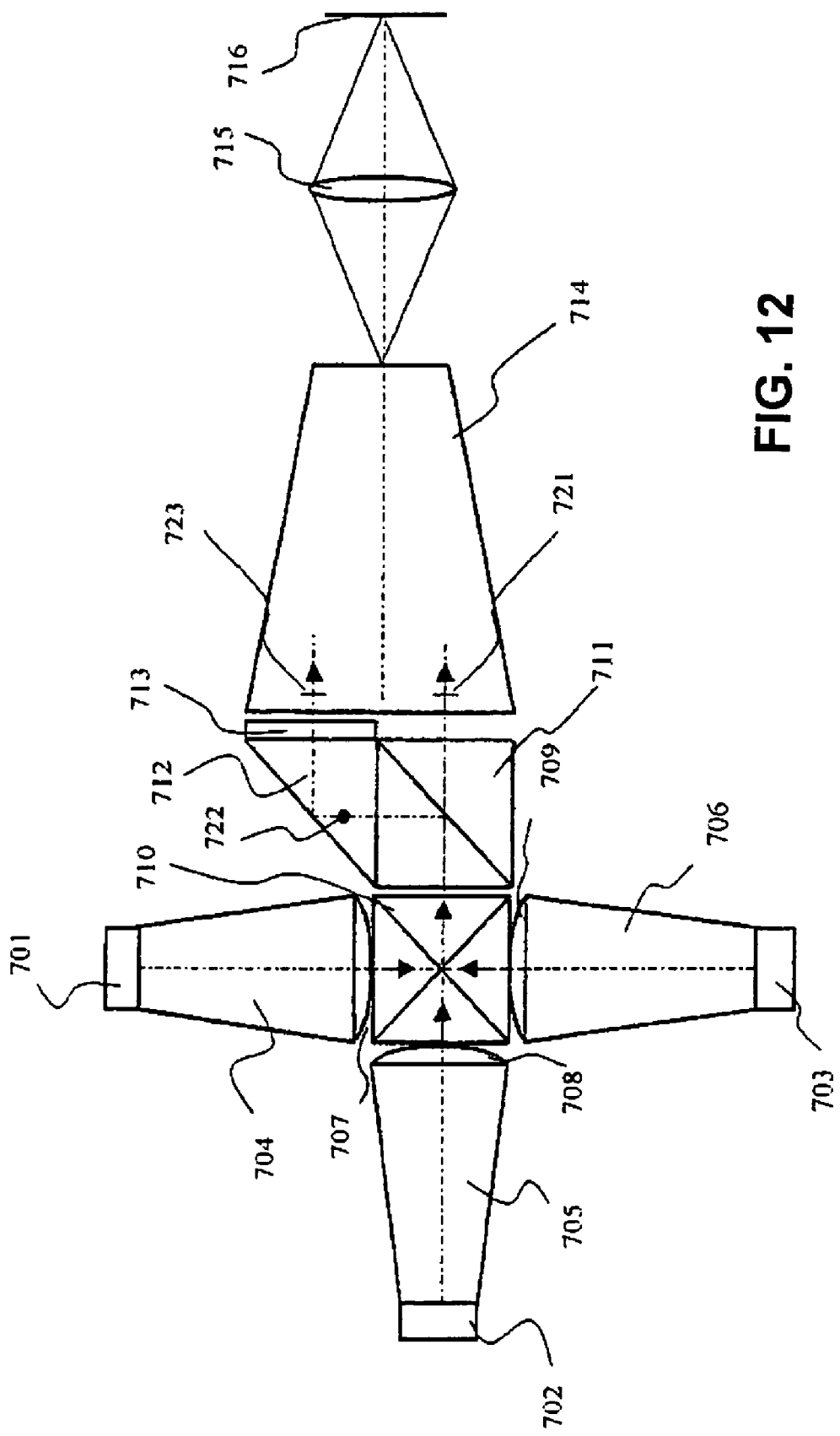
FIG. 12 is a schematic diagram illustrating another embodiment of an LED polarized light illumination system comprising an LCoS or LCD panel and components shown in FIGS. 3, 4, 6, and 9.

The illumination system in FIG. 11 can be further modified in many different configurations. For instance, lenses can be attached to the exit surface of the waveguides to make the exit beams from three waveguides become further converged. Furthermore, a tapered waveguide, cross-dichroic prism, PBS prism and 45 degree prism may be regarded as a combining light integrator to achieve uniform light at the polarization conversion output. The uniform light can be directly relayed to LCOS or LCD panel, as shown in FIG. 12, wherein the homogenizer/waveguide assembly shown in FIG. 2 is replaced with one shown in FIG. 3. The light emitting from red LED 701, green LED 702 and blue LED 703 are collimated, homogenized, and guided by tapered waveguides 704, 705 and 706, respectively. The light beams exiting from three waveguides 704, 705 and 706 are further converged by three lenses 707, 708 and 709 and thereafter enter into three entrance surfaces of the non-polarizing cross-dichroic combiner 710. If the cross-dichroic combiner, PBS and 45-degree prism are all made of solid glass, they can form a combined light integrator to achieve more uniform light at the polarization conversion output. An imaging lens can directly relay the uniform output to LCOS or LCD panel.

Figure 13:
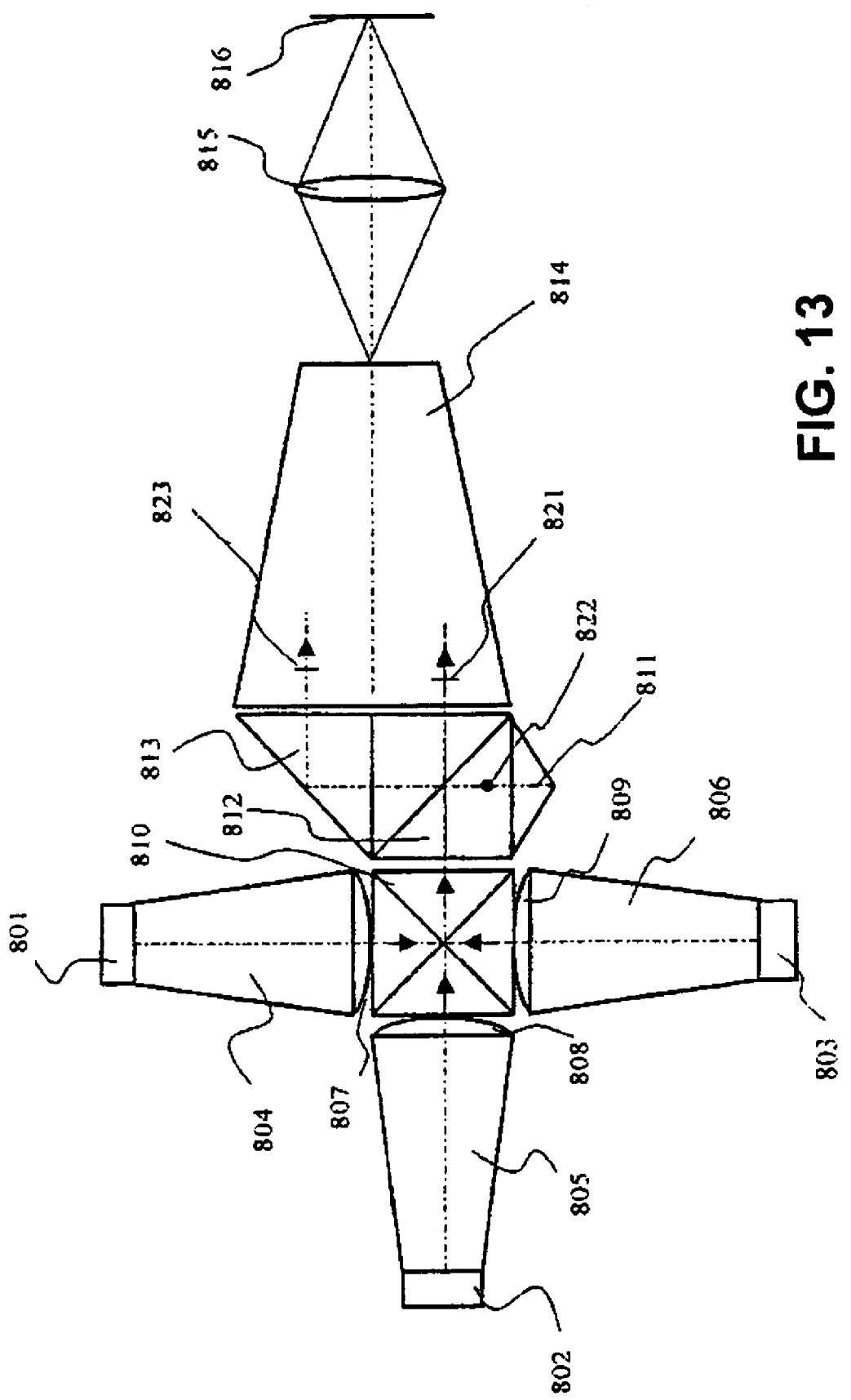
FIG. 13 is a schematic diagram illustrating yet another embodiment of an LED polarized light illumination system comprising an LCoS or LCD panel and components shown in FIGS. 3, 4, 7, and 9.

FIG. 13 shows a variation to implement an illumination system in accordance with an embodiment of the present invention, comprising an LCoS or LCD panel and components demonstrated in FIGS. 3, 4, 7 and 9. The light emitting from red LED 801, green LED 802 and blue LED 803 are homogenized and guided by tapered waveguides 804, 805 and 806, respectively. The light beams exiting from three waveguides 804, 805 and 806 are further converged by three lenses 807, 808 and 809 and thereafter enter into three entrance surfaces of the non-polarizing cross-dichroic combiner 810. If the waveguide is made of solid glass rod, the lens and corresponding rod can be integrated to a one-piece optical component. The embodiment employs the polarization conversion system shown in FIG. 7, which comprises a PBS cube 812, a 45-degree prism 813, and a retro-reflective polarization rotator 811.

A detailed description of a retro-reflective polarization rotator can be found in U.S. Patent Publication No. 2004/0090763, which is herein incorporated by reference. The main advantages of this apparatus are that it is not sensitive to wavelength variations of the incoming light, temperature changes and polarization alignment errors. The incident light entering the PBS 812 is split into the s-polarized light 822 and the p-polarized light 821. The p-component 821 transmits through PBS 812 while the s-component 822 reflects downwardly. Unlike the embodiment shown in FIG. 12, a polarization rotator 811 is used to replace the half waveplate to rotate the polarization direction of the s-component 822 coming from PBS 812 by 90 degrees. After being reflected from the polarization rotator 811, the otherwise wasted s-component 822 becomes p-polarized beam 823 and passes through the PBS cube 812 to the prism 813. The 45-degree prism 813 then redirects p-polarized beam 823 in a propagation direction parallel to the direction of the p-component 821.

Figure 14:
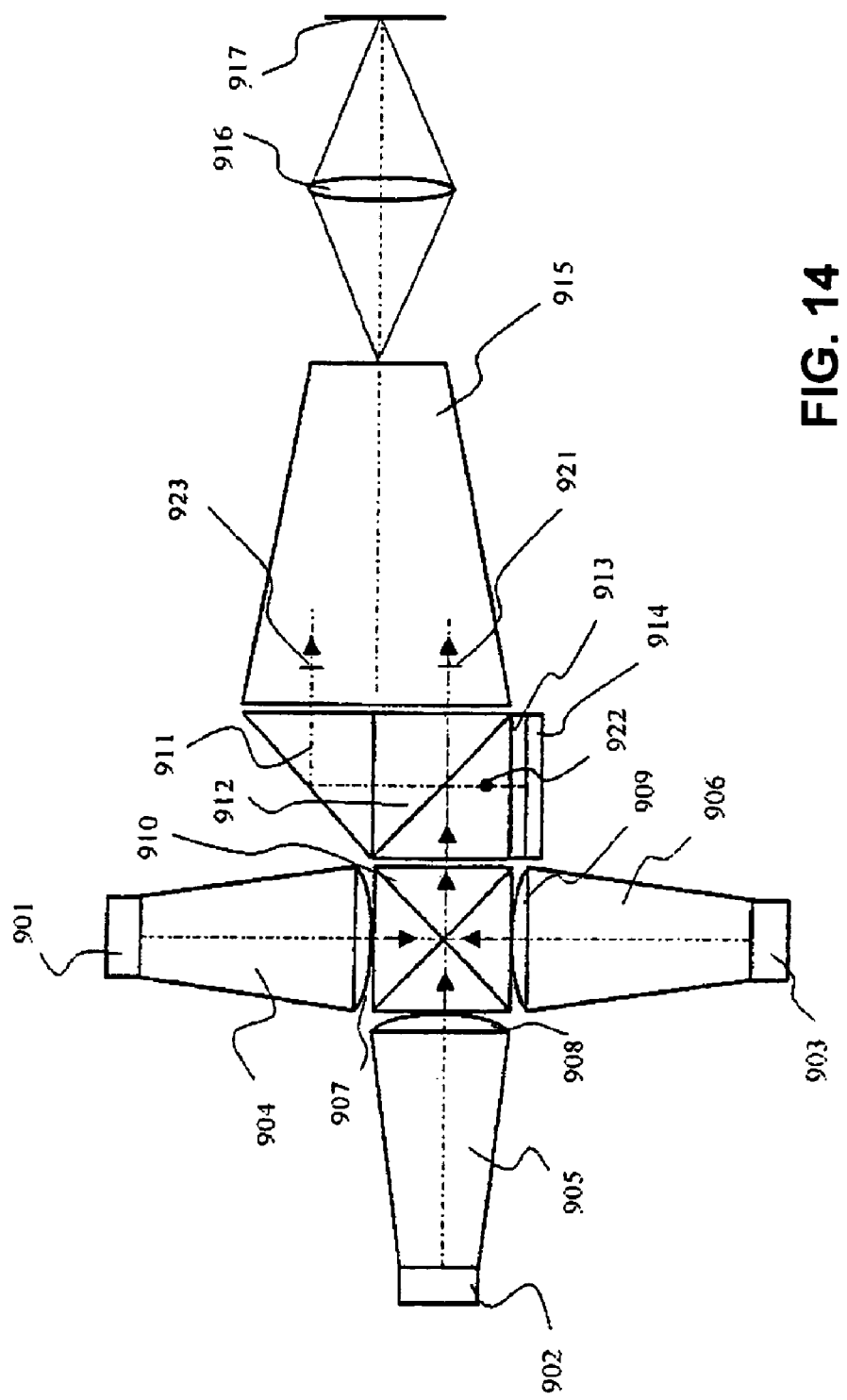
FIG. 14 is a diagram illustrating yet another embodiment of an LED polarized light illumination system comprising an LCoS or LCD panel and components shown in FIGS. 3, 4, 8 and 9.

Another alternative embodiment for a polarization recovery apparatus introduced in FIG. 8 is shown in FIG. 14, which includes three LED 901, 902 and 903; three tapered waveguides 904, 905 and 906; three lenses 907, 908 and 909; a non-polarizing cross-dichroic combiner 910; a PBS cube 912; a 45-degree prism 911; a quarter wave plate 913 and a mirror 914; an output waveguide 915; a condenser lens 916; and an LCoS or LCD panel 917. The polarization conversion and recovery system includes the PBS cube 912, the 45-degree prism 911, the quarter wave plate 913 and the mirror 914. The light entering the PBS 912 is split into the s-polarized light 922 and the p-polarized light 921. The p-component 921 transmits through PBS 912. The s-component 922 passes the quarter wave plate 913 and becomes circularly polarized. After reflected from the mirror 914 and again passes through the quarter wave plate 913, it becomes p-polarized. The recovered p-component 923 passes through the PBS cube 912 to the prism 911. The 45-degree prism 911 then redirects the beam 923 in a propagation direction parallel to the direction of p-component 921.

Figure 15:
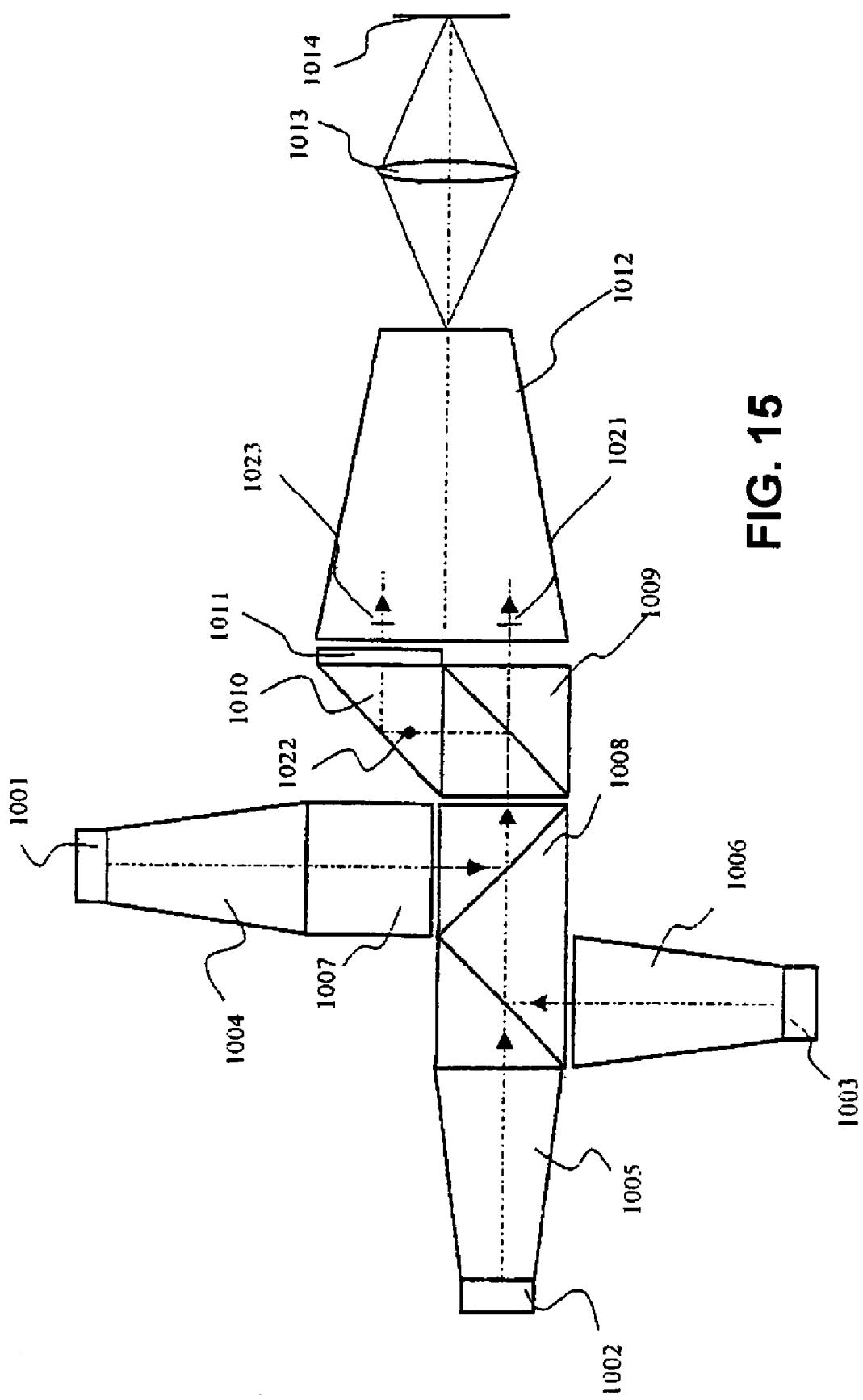
FIG. 15 is a schematic diagram illustrating yet another embodiment of an LED polarized light illumination system comprising an LCoS or LCD panel and components shown in FIGS. 2, 5, 6, and 9.

FIG. 15 shows another variation to implement an illumination assembly in accordance with the present invention, comprising an LCoS or LCD panel and components shown in FIGS. 2, 5, 6, and 9, wherein a non-polarizing V-type dichroic combiner in FIG. 5 is employed to replace the non-polarizing cross-dichroic combiner shown in FIG. 4. The inner surface of the V-type dichroic combiner 308 is coated with two different dichroic coatings 1030 and 1031. Coating 1030 transmits green and red color and reflects blue color, while coating 1031 transmits green and blue color and reflects red color. The light emitting from green LED 1002, guided by waveguide 1005, passes through the dichroic coatings 1030 and 1031 while the light emitting from the blue LED 1003, guided by waveguide 1006, is reflected from the coating 1030 and passes through the coating 1031.

The optical axes of the red path, green path and blue path are coincident on the exit face of the V-type dichroic combiner 1008. The function of the gap between the blue waveguide 1006 and dichroic combiner 1008 and the gap between the glass volume 1007 and dichroic combiner 1008 is similar to that of FIG. 11. The light exiting from the green waveguide reflects internally on both side surfaces of the V-type dichroic combiner and leakage of green light into the blue and red waveguides can be prevented.

Figure 16:
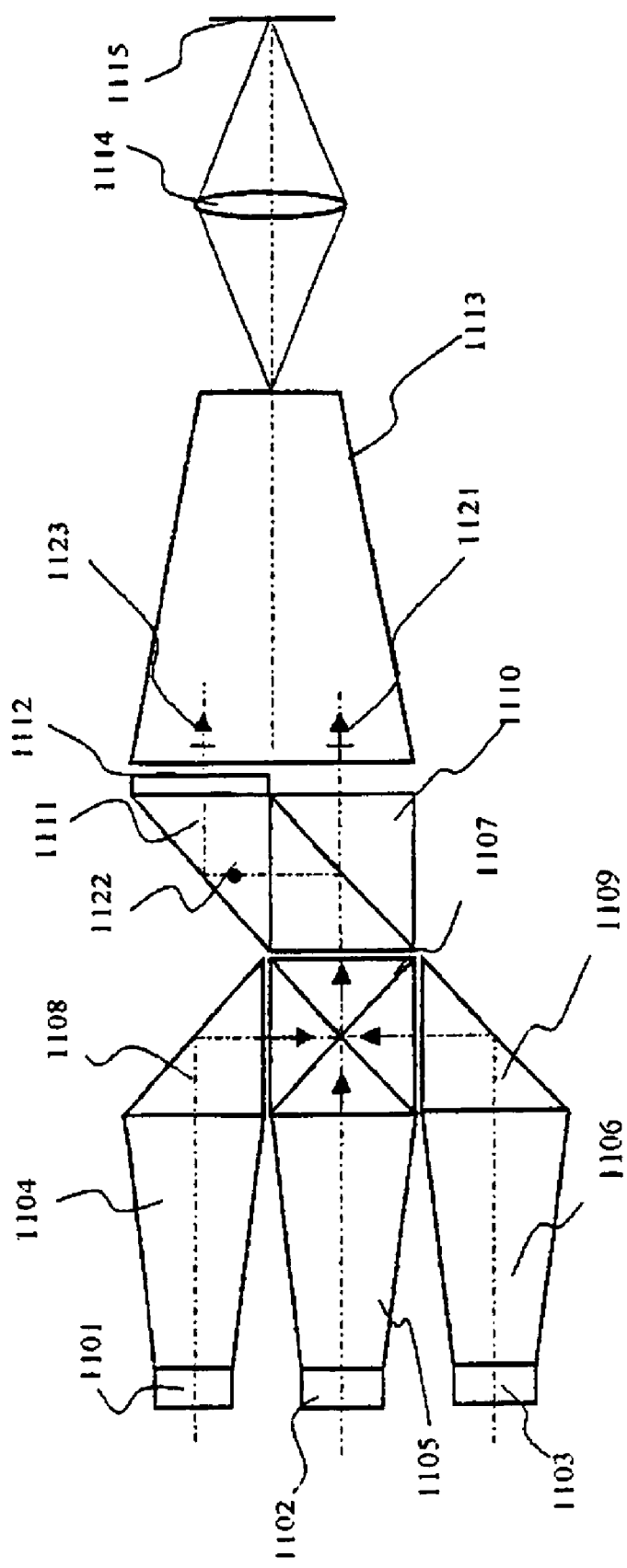
FIG. 16 is a diagram illustrating an alternative arrangement of an LED polarized light illumination system comprising an LCoS or LCD panel and components shown in FIGS. 2, 4, 6, and 9, wherein three LED assemblies are located on the same plate.

FIG. 16 illustrates an alternative configuration in accordance with the present invention, comprising components shown in FIGS. 2 4, 6, and 9. The system includes a red LED 1101, a green LED 1102, a blue LED 1103, three tapered waveguides 1104, 1105 and 1106, a non-polarizing cross-dichroic combiner 1107, two 45-degree prisms 1108 and 1109, a PBS 1110, a 45-degree prism 1111, a half wave plate 1112, an output waveguide 1113, a condenser lens 1114 and a panel 1115. Different from the first embodiment, three LEDs are configured to be on the same plate to make the system more compact. Two 45-degree prisms 1108 and 1109 are arranged next to two side surfaces of non-polarizing cross-dichroic combiner 1107 with gaps. The light from the red LED 1101, passing through the waveguide 1104, is reflected from the 45-degree prism 1108 and is then reflected from the non-polarizing cross-dichroic combiner 1107. Similarly, the light from the blue LED 1103, passing through the waveguide 1106, is reflected from the 45-degree prism 1109 and is then reflected from non-polarizing cross-dichroic combiner 1107. The green light of LED 1102, passing through the waveguide 1105, transmits through non-polarizing cross-dichroic combiner 1107. The red, green and blue optical axes are coincident on the exit face of the dichroic combiner 1107.

In summary, the present invention provides a polarized light illumination apparatus using light beams emitted from multicolor LEDs for LCD or LCoS projection applications. The invention greatly improves the color gamut of the imaging, eliminates unwanted UV and IR light as well as low efficiency color wheels. Thus, the luminous efficiency and the operating life of the light source are significantly increased by providing a light engine comprised of a unique combination of optical components. Overall, the light engine collimates, combines and converts RGB LED light with high efficiency and compact size.

We claim:

1. A polarized light illumination system comprising:
   at least one light emitting diode (LED) for providing a source of light;
   a non-polarizing dichroic combiner for combining at least two non-polarized light inputs from the at least one LED into a single light source;
   a polarized beam splitter (PBS) for splitting the single light source into polarized light components;
   an output waveguide for providing a source of uniformly illuminated light; and
   a condenser lens for projecting the uniformly illuminated light to a microdisplay panel.

2. A polarized light illumination system as in claim 1, further comprising:
   a prism for propagating at least one of the polarized light components to the output waveguide.

3. A polarized light illumination system as in claim 1, further comprising:
   a half wave plate for rotating the polarization state of at least one of the polarized light components.

4. A polarized light illumination system as in claim 1, further comprising:
   a polarization rotator for rotating the polarization of at least one of the polarized light components.

5. A polarized light illumination system as in claim 1, further comprising:
   an optical waveguide for receiving the source of light from the at least one LED.

6. A polarized light illumination system as in claim 5, further comprising:
   a converging lens for directing light from the optical waveguide to the non-polarizing dichroic combiner.

7. A polarized light illumination system as in claim 1, wherein the polarized light components are s-polarized light and p-polarized light.

8. A polarized light illumination system as in claim 1, wherein the microdisplay panel is a digital light processing (DLP) panel.

9. A polarized light illumination system as in claim 1, wherein the non-polarizing dichroic combiner is a cross-type combiner or a V-type combiner.

10. A polarized light illumination system as in claim 1, wherein the polarized light illumination system is used in a television.

11. A polarized light illumination system for projecting a color image comprising:
    a light emitting diode (LED) illumination assembly, wherein the LED illumination assembly is comprised of:
        at least one LED light source;
        at least one waveguide for directing light from the at least one LED light source; and
        a non-polarized dichroic combiner for combining at least two inputs of non-polarized light from the at least one waveguide into a single source of light;
    a polarizing beam splitter (PBS) for splitting light from the LED illumination assembly into a p-component and s-component;
    a polarization rotation apparatus for converting the p-component to an s-component;
    an output light integrator for integrating the s-component sources of light into a uniform light source; and
    a condenser lens for directing the uniform light source to a microdisplay panel.

12. A polarized light illumination system as in claim 11, further comprising:
    a lens positioned at one end of the at least one waveguide for focusing light from the at least one waveguide to the non-polarized dichroic combiner.

13. A polarized light illumination system as in claim 11, wherein the at least one waveguide is a hollow light pipe.

14. A polarized light illumination system as in claim 11, wherein the at least one waveguide is a solid integrator rod.

15. A polarized light illumination system as in claim 11, wherein the non-polarizing dichroic combiner is a cross-dichroic combiner.

16. A polarized light illumination system as in claim 11, wherein the non-polarizing dichroic combiner is a V-type dichroic combiner.

17. A polarized light illumination system as in claim 11, farther comprising: a prism for directing light from the PBS to the polarization rotation apparatus.

18. A polarized light illumination system as in claim 11, wherein the polarization rotation apparatus is a half wave plate.

19. A polarized light illumination system as in claim 11, wherein the polarization rotation apparatus is a retro-reflective polarization rotator.

20. A polarized light illumination system as in claim 11, wherein the polarized light illumination system is used in a television receiver.

21. A method for providing polarized light illumination comprising the steps of:
- providing a source of light using at least one light emitting diode (LED);
- combining at least two non-polarized light inputs from the at least one LED into a single light source using a non-polarizing dichroic combiner;
- splitting the single light source into polarized light components using a polarizing beam splitter (PBS);
- providing a source of uniformly illuminated light using an output waveguide; and
- projecting the uniformly illuminated light to a microdisplay panel using a condenser lens.

22. A method for providing polarized light illumination as in claim 21, further comprising the step of:
- propagating at least one of the polarized light components to the output waveguide using a prism.

23. A method for providing polarized light illumination as in claim 21, further comprising the step of:
- rotating the polarization state of at least one of the polarized light components using a half wave plate.

24. A method for providing polarized light illumination as in claim 21, further comprising the step of:
- rotating the polarization of at least one of the polarized light components using a polarization rotator.

25. A method for providing polarized light illumination as in claim 21, further comprising the step of:
- receiving the source of light from the at least one LED using an optical waveguide.

26. A method for providing polarized light illumination as in claim 25, further comprising the step of:
- directing light from the optical waveguide to the non-polarizing dichroic combiner using a converging lens.

27. A method for providing polarized light illumination as in claim 21, wherein the polarized light components are comprised of s-polarized light and p-polarized light.

28. A method for providing polarized light illumination as in claim 21, wherein the microdisplay panel is a digital light processing (DLP) panel.

29. A method for providing polarized light illumination as in claim 21, wherein the non-polarizing dichroic combiner is a cross-type combiner or a V-type combiner.

30. A method for providing polarized light illumination as in claim 21, wherein the polarized light illumination system is used in a television.

\* \* \* \* \*